M. E. NEENAN.
ELEVATOR DRIVING MECHANISM.
APPLICATION FILED JULY 18, 1907. RENEWED MAY 29, 1913.
1,083,695.
Patented Jan. 6, 1914.
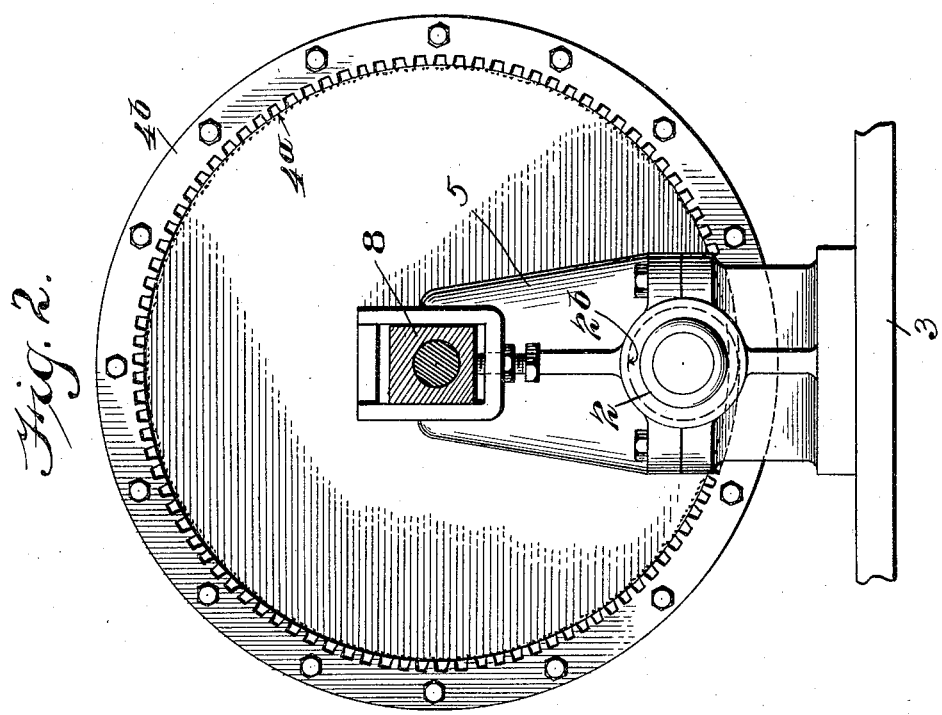
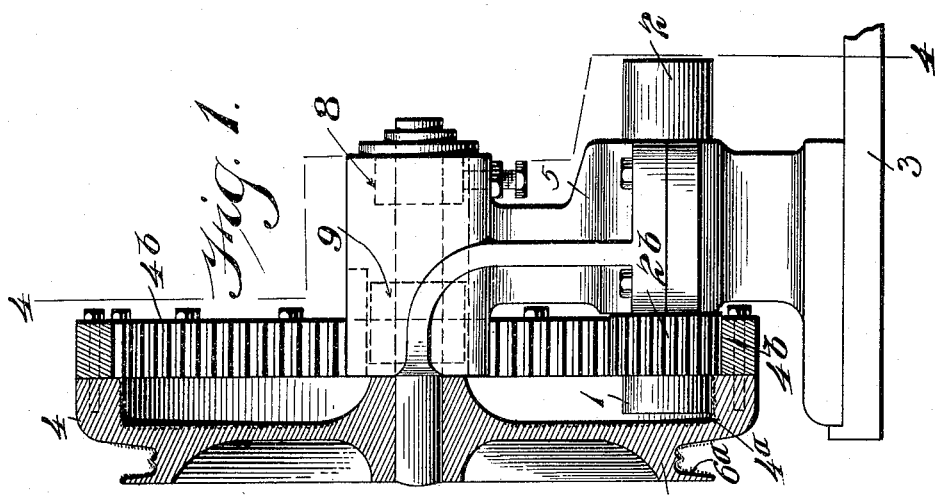
WITNESSES
INVENTOR
Michael E. Neenan
BY
ATTORNEYS

UNITED STATES PATENT OFFICE.

MICHAEL E. NEENAN, OF NEW YORK, N. Y., ASSIGNOR TO NEENAN ELEVATOR COMPANY, A CORPORATION OF NEW YORK.

ELEVATOR-DRIVING MECHANISM.

1,083,695.   Specification of Letters Patent.   Patented Jan. 6, 1914.

Application filed July 18, 1907, Serial No. 384,386. Renewed May 29, 1913. Serial No. 770,791.

*To all whom it may concern:*

Be it known that I, MICHAEL E. NEENAN, a citizen of the United States, residing in the borough of Manhattan, in the city and State of New York, have invented certain new and useful Improvements in Elevator-Driving Mechanism, of which the following is a specification.

My invention relates to a driving mechanism for elevators in which the hoisting drum is so mounted as to dispense with any external bearing and thus permit the car to pass close to the face of the drum.

In my invention provision is made for sustaining or eliminating the torsional, angular, or deflecting strain on the drum, resulting from the strain of the hoisting ropes or other power-transmitting means sustained by such drum on one side of its bearing or beyond the plane of the driving pinion or other power-member by which the drum is actuated. The said hoisting drum has an internal annular face through which it is driven by the action of a friction pinion on the main driving shaft, and the internal driving face of the main drum is extended longitudinally in the form of a cogged or toothed rim acted on by a cog pinion on the driving shaft, whose pitch line corresponds in diameter with the friction driving pinion. The cogged gearing prevents back lash in the hoisting gear and insures positive action. In the interest alike of strength and durability and economy in manufacture, the internal toothed rim of the rope driving drum may be advantageously made separate from main drum and of stronger material. The friction pulley is formed of a case-hardened ring fixed on the end of the driving shaft. The vertical strain incident to the rope drive will be sustained largely by the main driving shaft and the driving members thereon, but this may be reinforced by the bearings of the central shaft of the drum. This shaft may extend completely over to the frame of the motor.

The invention also relates to means for effecting the vertical adjustment of the shaft or bearings of the rope driving drum, and securing the same against lateral movement.

The invention further relates to other details of construction by which the invention is carried into effect.

In the accompanying drawings: Figure 1 is a side elevation, partly in longitudinal section, of the internally driven driving drum and its accessories. Fig. 2 is an elevation of the same from the inner side, partly in the transverse section on the line 4—4, Fig. 1.

Referring to the drawings, 1 represents a friction pinion keyed on a shaft 2, which is mounted in a bearing on a substantial bed 3.

4 represents a wheel having an annular internal face $4^a$, supported by its shaft on a bearing 5 mounted on the same bed 3 and driven by frictional contact of the driving pinion 1 with the internal face $4^a$. The outer surface of the driven wheel is adapted to be acted on by a friction brake-device of common and suitable form, (not shown) so that the said wheel 4 may serve also as a brake-wheel. Arranged alongside the driven-wheel 4, and preferably formed integrally therewith is the driving sheave 6, here shown as adapted to drive the usual hoisting ropes of an elevator system (not shown), and provided with fibrous material $6^a$ on its driving face of any desirable thickness to increase friction. The internal driven face $4^a$ of the wheel 4 may also be provided with fibrous or other suitable material, of any desirable thickness, as illustrated in Fig. 1. The said friction driven face of the wheel 4 is held in forcible frictional contact with the driving pinion 1 by the upward strain of the hoisting rope or other power-transmitting medium driven by the sheave 6 and the angular or deflecting tendency of the strain thus applied to the wheel 4 in a plane on one side of the pinion 1 is taken up by a vertically adjustable bearing 8, in which the opposite end of the wheel shaft runs. It will be apparent that the resulting pressure applied to the bearing 8 by the hoisting rope, or other equivalent means, will produce increased pressure between the driving surface of pinion 1 and internal face $4^a$ according to leverage in proportion to the relative distances of the bearing 8 and sheave 6 on opposite sides of the mean plane of the pinion 1, by which the upward strain on the wheel 4 is resisted. The pressure of the internal face $4^a$ against the driving pinion 1 may thus be increased or reduced to any necessary degree by decreasing or increasing the distance of the bearing 8 with respect to the mean vertical plane of the driving bearing 1 and by changing the relative diameters of the respective frictional faces 4$^a$ and 6 by the thickness of fibrous material applied to either, or by other means the driving capacity of these faces may be relatively modified.

8 represents a bearing sliding vertically in a guide 9 to prevent sidewise movement of the shaft of the wheel 4 while permitting limited upward movement thereof, a space being provided between the top of the said bearing, and the bearing cap, in the normal position of the wheel, as illustrated in Fig. 2.

In practice the friction pinion is constructed with a separate driving face capable of renewal. This operates frictionally on the internal face 4$^a$ of the longitudinally projecting rim of the drum 4. This rim has a further extension 4$^b$, preferably separable, as shown, forming a cogged rim to gear with toothed pinion 2$^b$ keyed to the main driving shaft 2. The pitch line of the said toothed pinion 2$^b$ coincides accurately with the periphery of the friction pinion 1, so as to work in unison therewith. Under this system of rope driving the power may be regulated by the proportionate size of the driving pinion or pinions relatively to the diameter of the friction drum.

What I claim is:

1. In an elevator driving mechanism, a pedestal provided with bearings for driving and driven shafts, shafts mounted in said bearings, and a driving sheave mounted on said driven shaft and driven from said driving shaft, said driven shaft being supported upon one side of the sheave only.

2. In an elevator gearing, the combination with a driving sheave and a shaft upon which it is carried, one side face of said sheave being in a plane with the end of its shaft, and a bearing for said shaft arranged on the other side of said sheave.

3. In an elevator driving gear, the combination with a pedestal provided with two bearings, of shafts mounted in said bearings with their ends projecting therefrom, a driving sheave mounted on the extreme end of one of said shafts, and a driving pinion mounted on the other shaft, said pinion being adapted to drive the sheave.

4. In an elevator driving gear, a pedestal, a shaft projecting therefrom, and a driving sheave mounted on the outer end of said shaft, said sheave comprising a peripheral rope-driving surface on its outer side face and an internal frictional drive surface upon the inner side face of the sheave whereby the sheave is driven.

5. In an elevator driving mechanism, the combination of a frictional driving pinion, a driven shaft, a driven wheel mounted upon one end of said shaft and having an internal driven face in contact with said driving pinion, a driving sheave actuated by the driven wheel, and a bearing for said driven shaft, said driving sheave and shaft-bearing being located in planes on opposite sides of the contact plane of the driving pinion and internal driven face.

6. In an elevator driving mechanism, the combination of a driven shaft, a wheel or drum mounted upon one end of said shaft and provided with a rope-driving sheave having its side face in close juxtaposition to the plane of the end of said shaft, said wheel or drum having an internal annular face forming a friction driving surface and a cogged extension corresponding in pitch line with the diameter of said friction surface, a driving shaft, a friction pinion on said driving shaft coöperating with the friction driving surface of the wheel or drum, and a cog pinion on said driving shaft corresponding in pitch line with the diameter of the friction pinion and coöperating with the cogged extension of said wheel or drum, and bearings for supporting said driven shaft and driving shaft, said bearings being arranged on the side of the wheel or drum opposite to said rope driving sheave.

The foregoing specification signed at New York, N. Y. this twelfth day of July, 1907.

MICHAEL E. NEENAN.

In presence of two witnesses:
OCTAVIUS KNIGHT,
P. F. SONNEK.

---

Copies of this patent may be obtained for five cents each, by addressing the "Commissioner of Patents, Washington, D. C."